(12) United States Patent
Chae et al.

(10) Patent No.: US 7,492,418 B2
(45) Date of Patent: Feb. 17, 2009

(54) LIQUID CRYSTAL DISPLAY DEVICE WITH PARTICULAR METAL LAYER CONFIGURATION OF TFT AND FABRICATING METHOD THEREOF

(75) Inventors: Gee Sung Chae, Incheon-Shi (KR); Gyoo Chul Jo, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/028,305

(22) Filed: Dec. 28, 2001

(65) Prior Publication Data

US 2002/0135709 A1 Sep. 26, 2002

(30) Foreign Application Priority Data

Mar. 21, 2001 (KR) ............... 10-2001-0014650

(51) Int. Cl.
*G02F 1/136* (2006.01)
(52) U.S. Cl. ....................................... 349/43
(58) Field of Classification Search ............ 349/43
See application file for complete search history.

(56) References Cited

U.S. PATENT DOCUMENTS 5,731,856 A * 3/1998 Kim et al. ............... 349/43
5,867,233 A * 2/1999 Tanaka ................... 349/43
6,078,365 A * 6/2000 Ueda et al. .............. 349/43
6,184,946 B1 * 2/2001 Ando et al. .............. 349/42
6,271,903 B1 * 8/2001 Shin et al. ............... 349/110
6,323,051 B1 * 11/2001 Shimada ................. 438/30
6,529,251 B2 * 3/2003 Hibino et al. ............ 349/42
6,747,288 B2 * 6/2004 Yamazaki et al. ........ 257/57
6,806,499 B2 * 10/2004 Yamazaki et al. ........ 257/72

* cited by examiner

*Primary Examiner*—Timothy Rude
(74) *Attorney, Agent, or Firm*—Birch, Stewart, Kolasch & Birch, LLP

(57) ABSTRACT

A liquid crystal display device includes a substrate; a gate electrode over the substrate; a first semiconductor layer over the gate electrode; a second semiconductor layer over the first semiconductor layer; a first metal layer on the second semiconductor layer and patterned the same as the second semiconductor layer such that the first metal layer and second semiconductor layer define a separation region; and source and drain electrodes over the first metal layer. The source and drain electrodes are patterned the same as the first metal layer and the second semiconductor layer in the separation region. The source and drain electrodes include a second and a third metal layer.

16 Claims, 13 Drawing Sheets

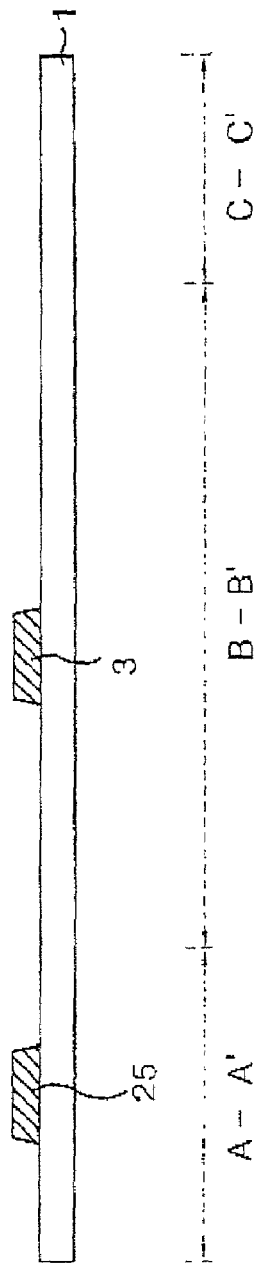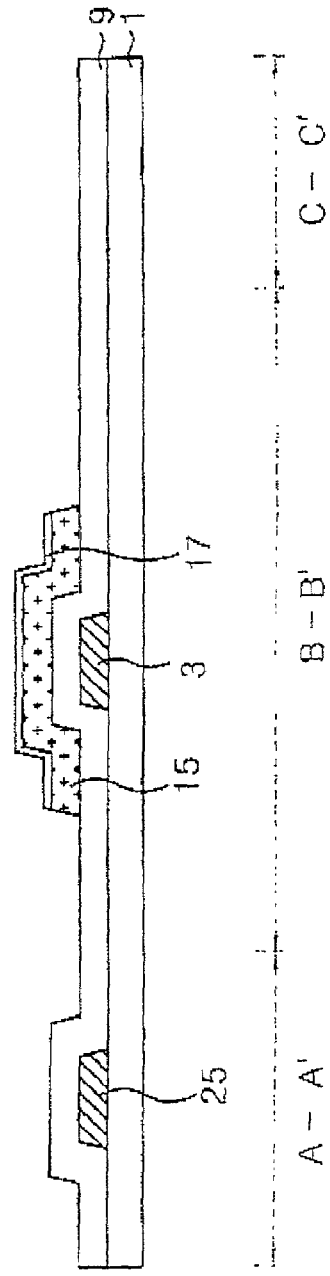

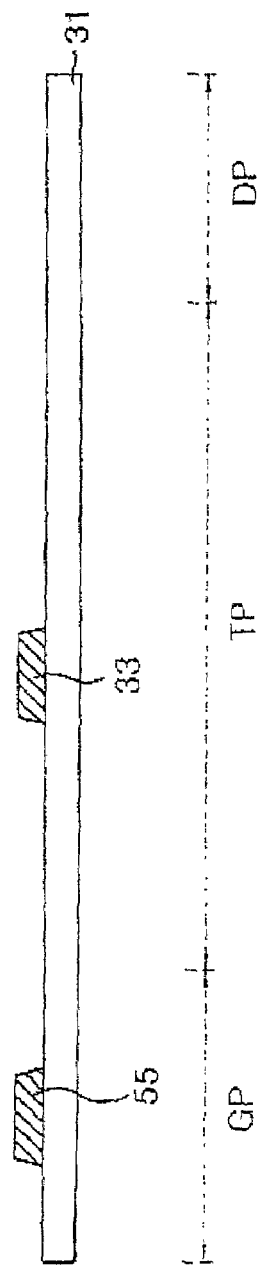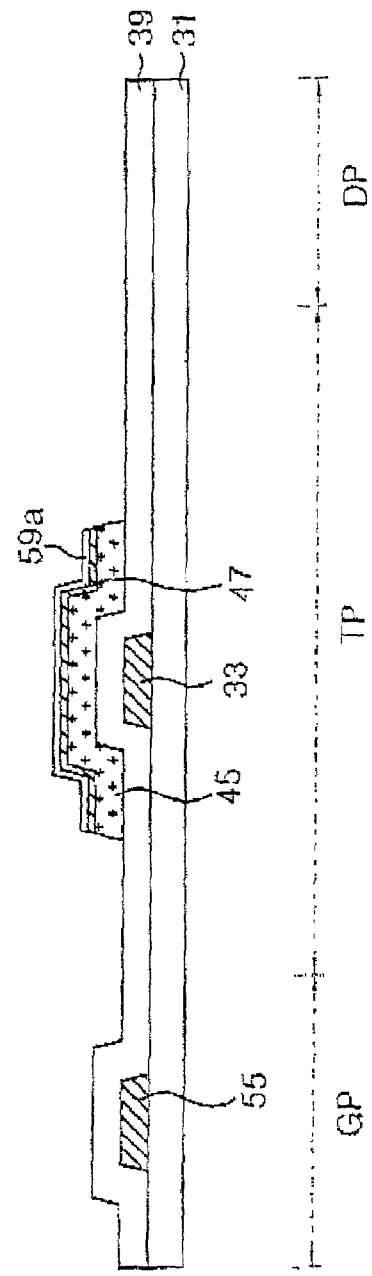

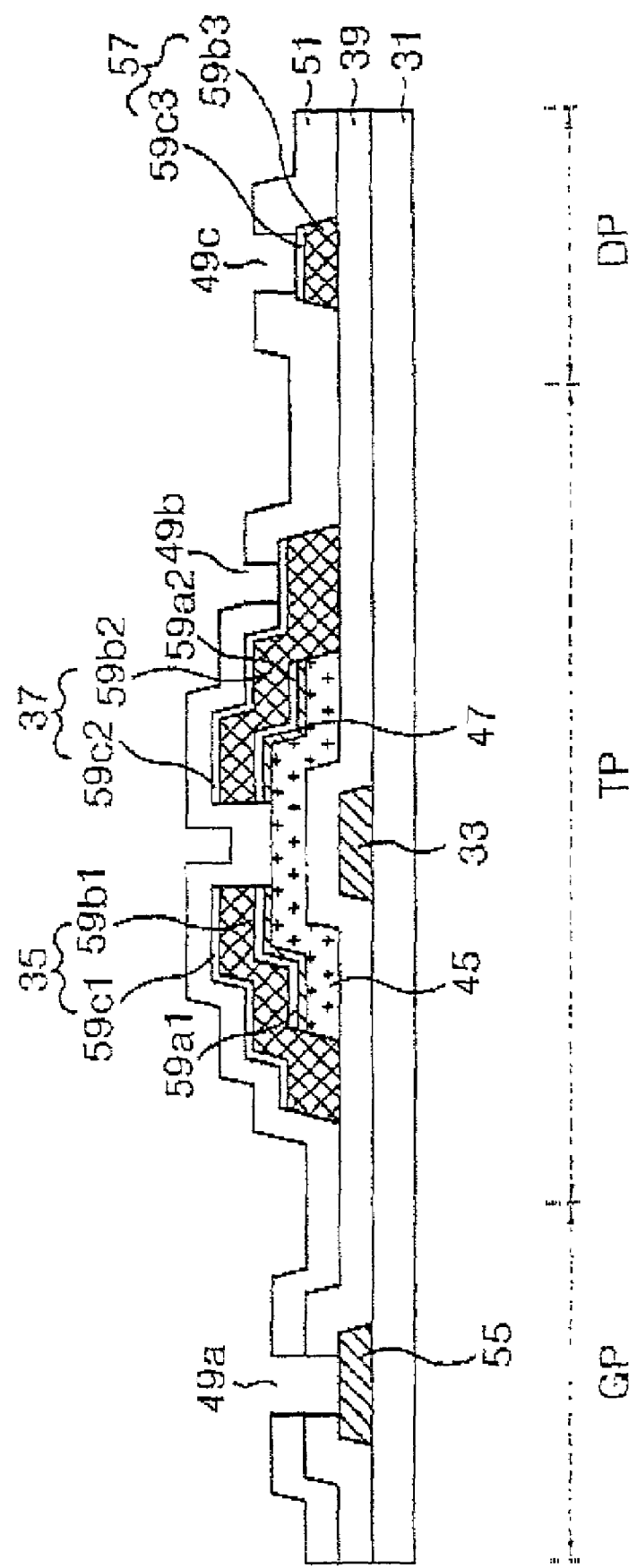

LIQUID CRYSTAL DISPLAY DEVICE WITH PARTICULAR METAL LAYER CONFIGURATION OF TFT AND FABRICATING METHOD THEREOF

BACKGROUND OF THE INVENTION

1. Field of the Invention

This invention relates to a liquid crystal display fabricating method thereof, and more particularly to a liquid crystal display device with a lowermost layer metal in a bus line having a three-layer structure.

2. Description of the Background Art

Generally, a liquid crystal display (LCD) controls a light transmittance using an electric field to display a picture. To this end, the LCD includes a liquid crystal panel having liquid crystal cells arranged in a matrix type, and a driving circuit for driving the liquid crystal panel. The liquid crystal panel is provided with pixel electrodes for applying an electric field to each liquid crystal cell, and a common electrode. Typically, the pixel electrode is provided on a lower substrate for each liquid crystal cell, whereas the common electrode is integrally formed on the entire surface of an upper substrate. Each of the pixel electrodes is connected to a thin film transistor (TFT) used as a switching device. The pixel electrode drives the liquid crystal cell, along with the common electrode, in accordance with a data signal applied via the TFT.

FIG. 1 and FIG. 2 depict a conventional LCD device. As shown in FIG. 1, a lower substrate 1 of a LCD includes a TFT T arranged at an intersection between a data line 13 and a gate line 11, a pixel electrode 23 connected to a drain electrode 7 of the TFT, a data pad portion DP connected to the data line 13, and a gate pad portion GP connected to the gate line 11.

The TFT T includes a gate electrode 3 connected to the gate line 11, a source electrode 5 connected to the data line 13, and a drain electrode 7 connected, via a drain contact hole 19b, to the pixel electrode 23. Further, as shown in FIG. 2, the TFT T includes semiconductor layers 15 and 17 for defining a channel between the source electrode 5 and the drain electrode 7 by a gate voltage applied to the gate electrode 3. Such a TFT T responds to a gate signal from the gate line 11 to selectively apply a data signal from the data line 13 to the pixel electrode 23.

The pixel electrode 23 is positioned at a cell area divided by data line 13 and gate line 11 and is made from a transparent conductive material having a high light transmittance. The pixel electrode 23 is electrically connected to the drain electrode via the drain contact hole 19b. The pixel electrode 23 generates a potential difference from a common transparent electrode (not shown) provided at an upper substrate (not shown) by a data signal applied via the drain contact hole 19b. By this potential difference, a liquid crystal positioned between the lower substrate 1 and the upper substrate (not shown) is rotated due to its dielectric anisotropy. Thus, the liquid crystal allows a light applied from a light source to be transmitted into the upper substrate.

The gate pad portion GP applies a scanning signal, that is, a gaze pulse, from a gate driving integrated circuit (IC) (not shown) to the gate line 11. A gate pad terminal electrode 28 of the gate pad portion DP electrically contacts a gate pad 25 via a gate contact hole 19a.

The data pad portion DP applies a data signal from a data driving integrated circuit IC (not shown) to the data line 13. A data pad terminal electrode 29 electrically contacts a data pad 27 via a data contact hole 19c.

FIGS. 3A-3E depict a method of fabricating the LCD device having the above-mentioned configuration.

As shown in FIG. 3A, a gate metal layer is deposited onto the lower substrate 1, of the LCD device. Then, the gate metal layer was patterned to form a gate pad 25 and gate electrode 3. A gate insulating film 9 is formed entirely on the lower substrate 1, the gate pad 25 and the gate electrode 3, as shown in FIG. 3B. First and second semiconductor layers are deposited onto the gate insulating film 9 and then patterned to form an active layer 15 and an ohmic contact layer 17.

Subsequently, a data metal layer is deposited onto the gate insulating film 9 and then patterned to form the data pad 27, the source electrode 5 and the drain electrode 7, as shown in FIG. 3C. After patterning the source electrode 5 and the drain electrode 7, an ohmic contact layer 17 positioned on a portion of the active layer, which is above the gate electrode 3 is also patterned to expose the active layer 15. The exposed portion of the active layer 15 above the gate electrode 3 and between the source electrode 5 and the drain electrode 7 forms a channel 30.

As show, in FIG. 3D, an insulating material is deposited onto the gate insulating film 9 and patterned to form a protective layer 21. During the patterning, the data pad contact hole 19c and the drain contact hole 19b are defined to pass through the protective layer 21 and expose the data pad 27 and the drain electrode 7. Further, the gate pad contact hole 19a is defined to pass through the protective layer 21 and the gate insulating film 9 and expose the gate pad 25.

Subsequently, as shown in FIG. 3E, a transparent conductive material is deposited onto the protective layer 21 and patterned to form the pixel electrode 23, the gate pad terminal electrode 28 and the data pad terminal electrode 29. The pixel electrode 23 electrically contacts the drain electrode 7 via the drain contact hole 19b. The gate pad terminal electrode 28 electrically contacts the gate pad 25 via the gate contact hole 19a. The data pad terminal electrode 29 electrically contacts the data pad 27 via the data contact hole 19c.

The data pad 27, the source electrode 5 and the drain electrode 7 provided on the lower substrate 1 of the LCD are formed from a data metal layer of chrome (Cr) or molybdenum (Mo), etc., which is a single layer. As shown in FIG. 4, as the LCD moves toward a relatively higher resolution device, the data metal layer is formed into first through third metal layers 6a, 6b and 6c and has a three-layer structure.

The first and third metal layers 6a and 6c are made from Mo, which is electrically stable for a transparent conductive material, while the second metal layer 6b is made from aluminum (Al) or an aluminum alloy. If such a data metal three-layer structure is patterned, by a wet etching technique, then the first and third metal layers 6a and 6c are likely to be ionized within an etchant liquid in comparison to the second metal layer 6b due to an electrode potential difference between the first and third metal layers 6a and 6c and the second metal layer 6b. For example, the first and third metal layers 6a and 6c are oxidized by the second metal layer 6b, and the second metal layer 6b is deoxidized by the first and third metal layers 6a and 6c. For this reason, since as shown in FIG. 5, the first and third metal layers 6a and 6c are more undercut than the second metal layer 6b, upon deposition of the protective layer 21 the second metal layer 6b having a good reactivity with respect to the active layer 15 collapses. Further, the collapsed active layer 15 and second metal layer 6b contact each other and increase a leakage current. Also, since a deposition process of the three-layered data metal layer has three steps, problems of process quality and increased manufacturing cost occur.

SUMMARY OF THE INVENTION

Accordingly, it is an object of the present invention to provide a liquid crystal display device and a fabricating method thereof that are capable of preventing an over-etching of a lowermost layer metal in a bus line having a three-layer structure.

To achieve these and other objects of the invention a LCD device according to one embodiment includes a substrate; a gate electrode over the substrate; a first semiconductor layer over the gate electrode; a second semiconductor layer over the first semiconductor layer; a first metal layer on the second semiconductor layer and patterned in a same pattern as the second semiconductor layer such that the first metal layer and second semiconductor layer define a separation region; and source and drain electrodes over the first metal layer. The source and drain electrodes also patterned in the same pattern as the first metal layer and the second semiconductor layer in the separation region. Further, the source and drain electrodes include a second and a third metal layer.

The LCD further includes an insulating layer between the gate electrode and the first semiconductor layer; a protective layer over the source and drain electrodes and defining an upper portion of the separation region above the first metal layer and defining a contact hole exposing a portion of the drain electrode; and a pixel electrode in the contact hole.

The second metal layer may include aluminum and an aluminum alloy. The first and third metal layers may be formed of the same material or different materials. Further, the first and third metal layers may include titanium, tungsten, tantalum, chromium or molybdenum.

Another aspect of the invention includes a method of fabricating a liquid crystal display device including the steps of forming a gate electrode on a substrate; forming an active layer over the gate electrode; forming a first semiconductor layer over the active layer; forming a second semiconductor layer over the first semiconductor layer; forming a first metal layer over the second semiconductor layer; patterning the first metal layer and the second metal layer in a same pattern to define a channel region; and forming a source electrode and a drain electrode over the first metal layer.

Forming the source and drain electrodes includes forming a second metal layer over the first metal layer, forming a third metal layer over the first metal layer, and patterning the second and third metal layers in the same pattern as the first metal layer and second metal layer in the channel region so that a channel portion of the first semiconductor layer is exposed.

Additionally, the patterning of the first metal layer and the second metal layer to define a channel region includes removing a portion of the first metal layer and second metal layer corresponding to the gate electrode.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3A to FIG. 3E are section views depicting a conventional sequential process of fabricating the lower substrate of the LCD device depicted shown in FIG. 2;

FIGS. 7A to 7F are section views depicting a process of fabricating the lower substrate of the LCD device shown in FIG. 5.

DETAILED DESCRIPTION OF THE PREFERRED EMBODIMENT

Figure 1:
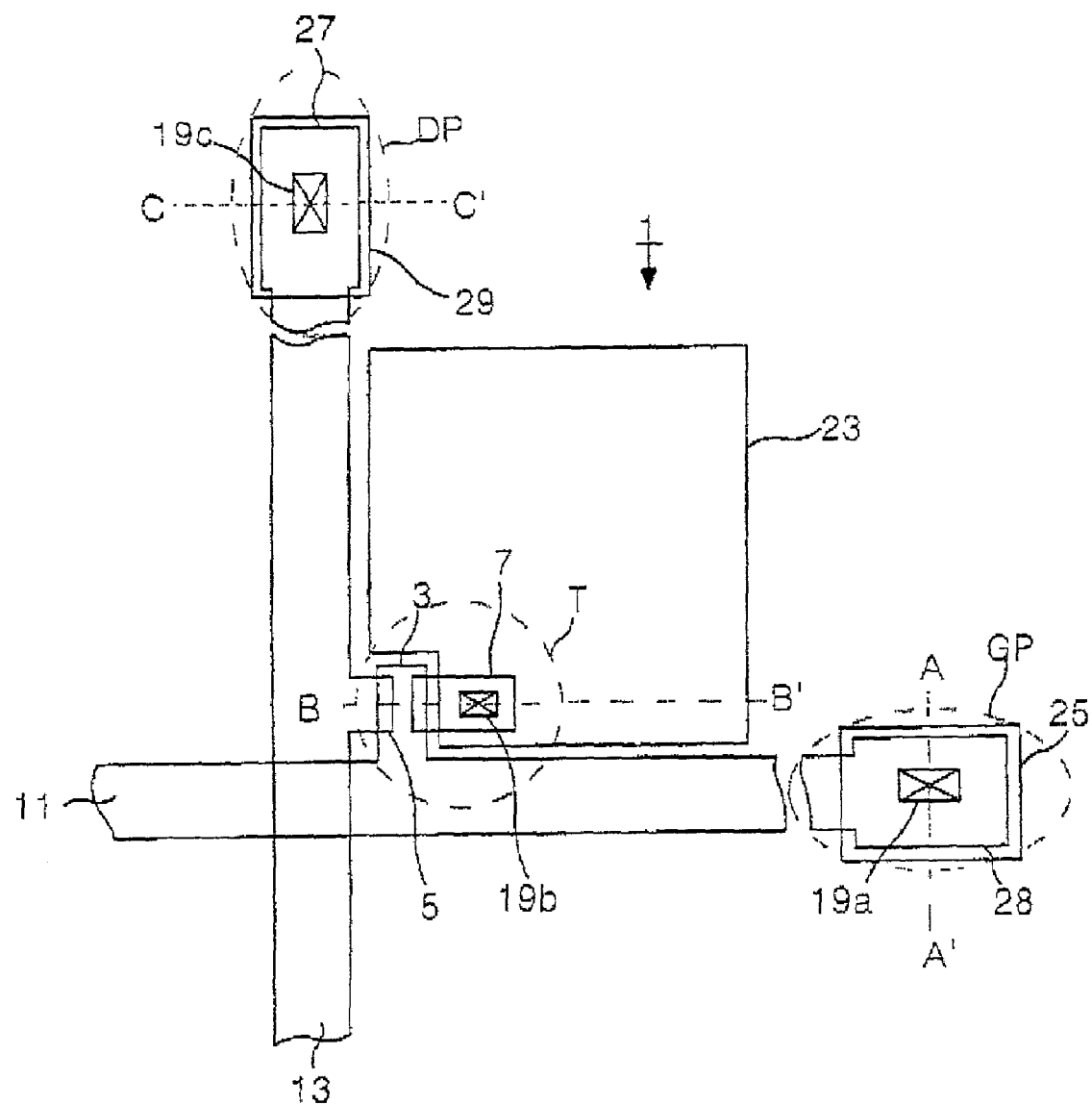
FIG. 1 is a plan view depicting a structure of a lower substrate of a conventional LCD device.
Figure 2:
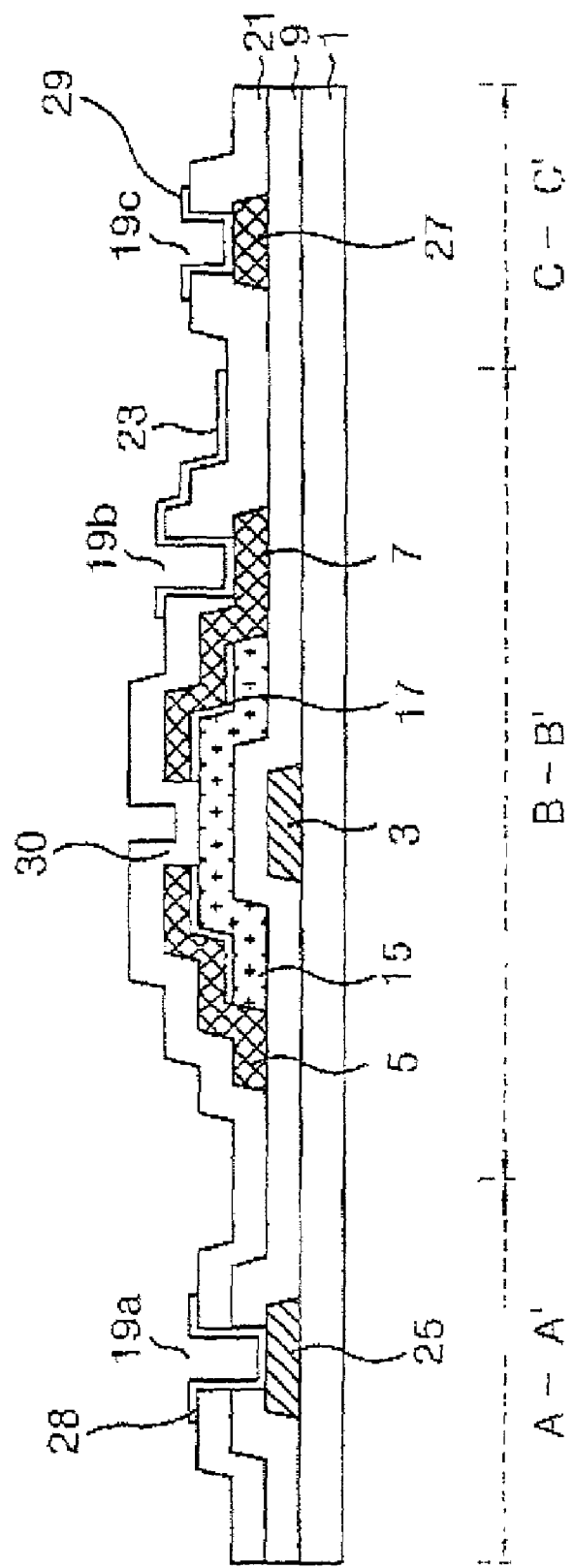
FIG. 2 is a section view of the lower substrate of the liquid crystal display taken along lines A-A', B-B' and C-C' of FIG. 1.
Figure 3C:
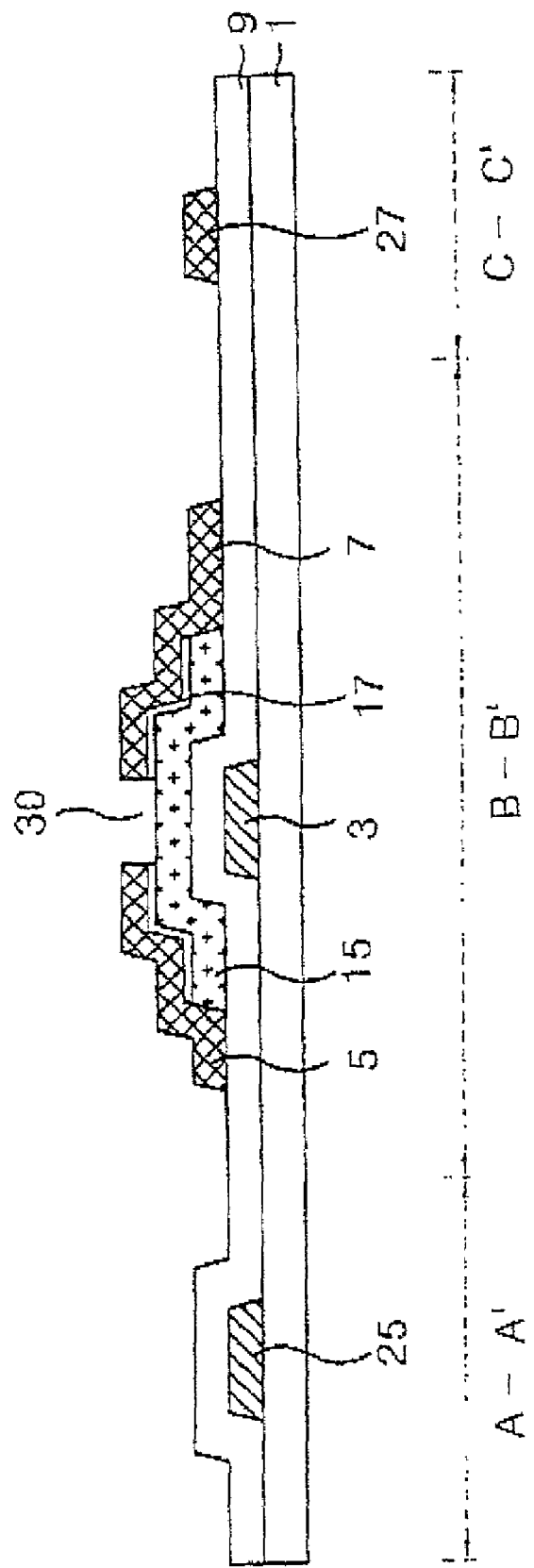
Figure 3D:
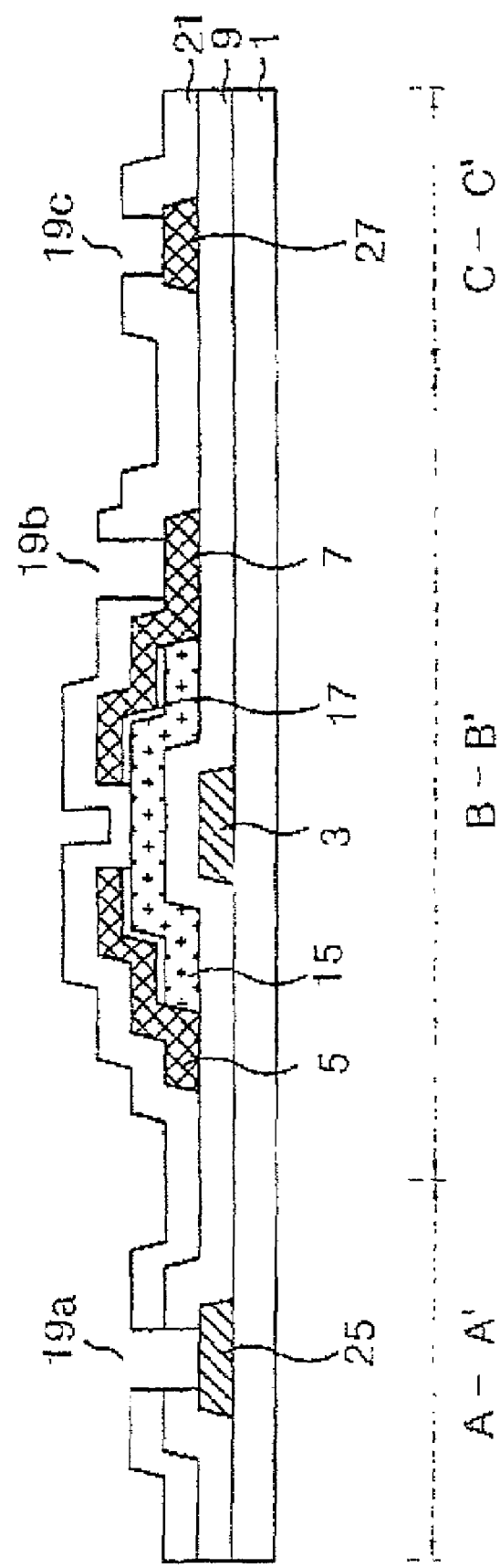
Figure 3E:
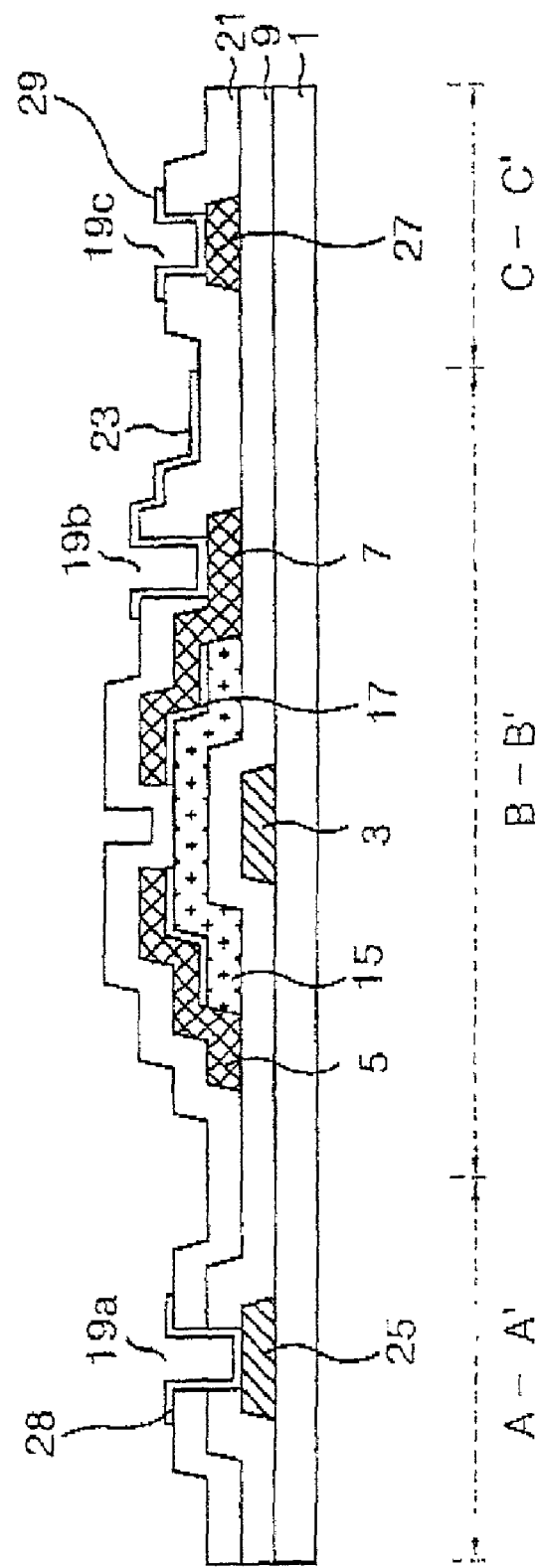
Figure 4:
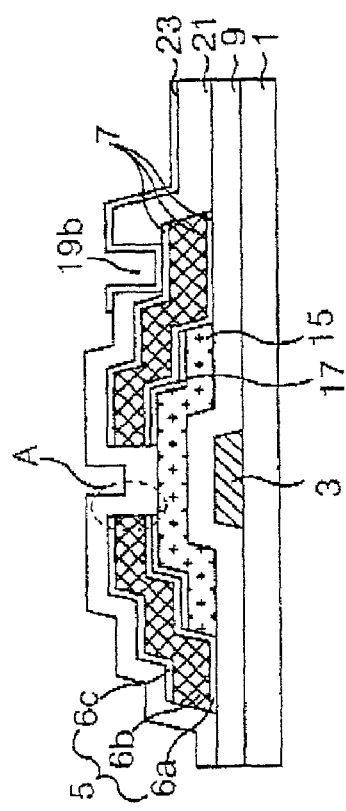
FIG. 4 is a section view representing an over-etch phenomenon of the conventional data metal layer having a three-layer structure.
Figure 5:
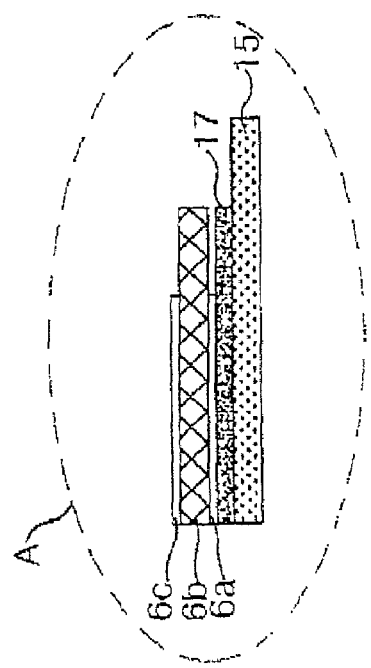
FIG. 5 is a section view depicting section A of FIG. 4.
Figure 6:
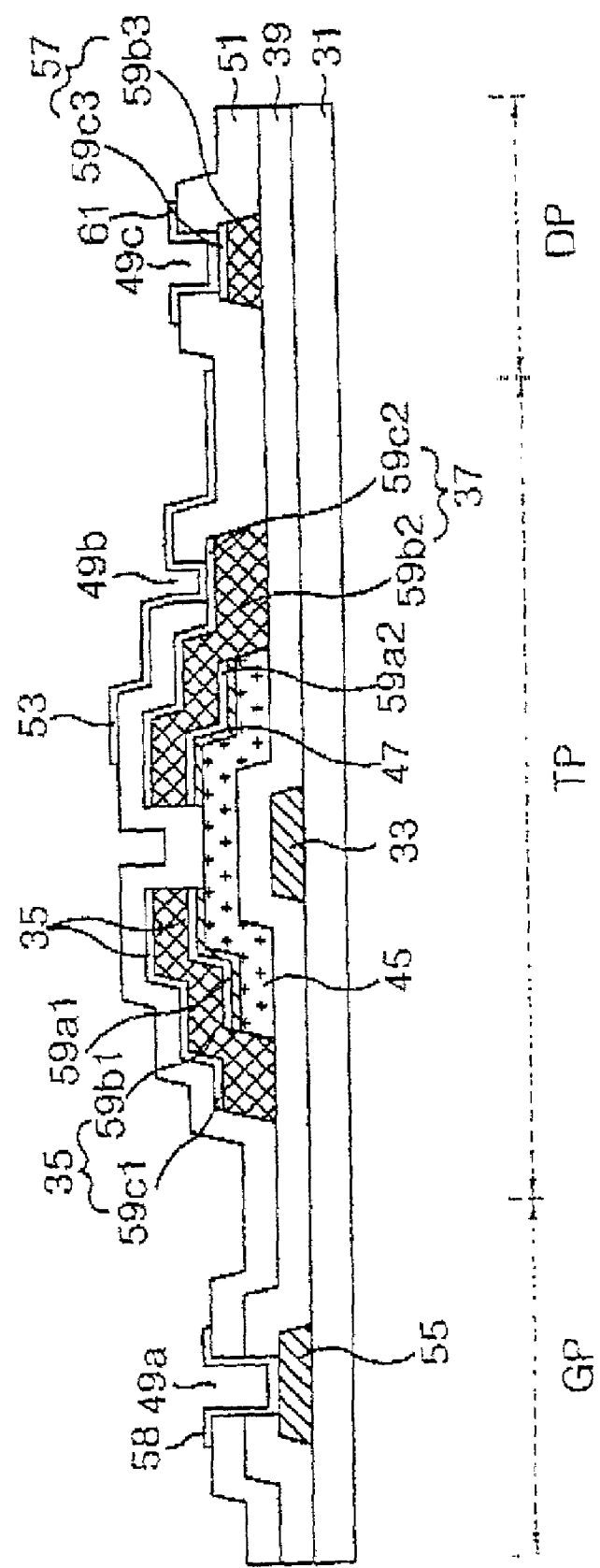
FIG. 6 is a section view depicting a structure of a lower substrate of a LCD device according to one embodiment of the present invention.

FIG. 6 depicts the structure of a LCD device according to one embodiment of the present invention.

Referring to FIG. 6, the thin film transistor part TP includes a gate electrode 33 with a gate insulating film 39, active layer 45 and ohmic contact layer 47 disposed over the gate electrode 33. A first barrier metal layer 59a is formed over the ohmic contact layer 47 and in the same pattern as the ohmic contact layer 47. Source and drain electrodes 35 and 37 are formed separately on the first barrier metal layer 59a1 and 59a2. The source and drain electrodes 35 and 37 include a main metal layer 59b1 and 59b2 and a second barrier metal layer 59c1 and 59c2.

The first barrier metal layers 59b1 and 59b2 and second barrier metal layers 59c1 and 59c2 are made from molybdenum (Mo), chrome (Cr), tungsten (W) or titanium (Ti), etc. The main metal layer 59b is made from aluminum (Al) or an Al alloy, etc.

The main metal layer 59b1 and 59b2 is used for transferring a signal. The first barrier metal layer 59a1 and 59a2 restrains a leakage current caused by a connection of the main metal layer 59b1 and 59b2 and the semiconductor layer 45 or 47. The second barrier metal layer 59c2 has a function or connecting electrically the main metal layer 59b2 to the pixel electrode 51.

The first barrier metal layer 59a1 and 59a2 is formed in the same pattern as the ohmic contact layer 47, and the main metal layer 59b1 and 59b2 and the second barrier metal layer 59c1 and 59c2 have the same pattern. Accordingly, the over-etching of the first barrier metal layer 59a can be prevented.

To protect such a thin film transistor part TP, a protective layer 51 is provided on the protective layers 51. The pixel electrode 53 contacts the drain electrode 37 via a drain contact hole 49b, which passes through the protective layer 51.

The gate pad part GP applies a scanning signal, which is a gate signal from a gate driving circuit (not shown) to the gate electrode 33 via a gate line (not shown). The gate pad part GP includes a gate pad 55 with the gate insulating film 39, the protective layer 51 and a gate pad terminal electrode 58 thereon. The gate pad terminal electrode 58 electrically contacts the gate pad 55 via a gate contact hole 49a passing through the gate insulating film 39.

The data pad part DP applies a data signal from a data driving circuit (not shown) to the source electrode 35 via a data line (not shown). The data pad part DP includes a data pad 57 with the protective layer 51 and a data pad terminal electrode 61 thereon. The data pad 57 is formed from the main metal layer 59b and the second barrier metal layer 59c. The data pad terminal electrode 61 electrically contacts the data pad 57 via a data contact hole 49c passing through the protective layer 51.

FIGS. 7A to 7F depict one embodiment of a method of fabricating the lower substrate 31 of the LCD device in FIG. 6.

Referring to FIG. 7A, the gate pad 55 and the gate electrode 33 are provided on the lower substrate 31. The gate pad 55 and the gate electrode 33 are formed by depositing materials such as aluminum (Al) or copper (Cu) onto the lower substrate 31 by a deposition technique such as a sputtering, etc. and patterning the deposited material.

Referring to FIG. 7B, the active layer 45, the ohmic contact layer 47 and the first barrier metal layer 59a are provided on the gate insulating film 39. The gate insulating film 39 is formed by depositing an insulating material entirely onto the lower substrate 31 so that the gate pad 55 and the gate electrode 33 are covered by the insulating material. The active layer 45, the ohmic contact layer 47 and the first barrier metal layer 59a are formed by sequentially placing first and second semiconductor materials and a metal layer onto the gate insulating film 39 and simultaneously patterning the first and second semiconductor materials and metal layer.

In this case, the insulating material, first and second semiconductor materials and metal layer maybe deposited, for example, by the plasma enhanced chemical vapor deposition (PECVD) technique. Alternatively, the insulating material and first and second semiconductor materials may be deposited by the PECVD technique and thereafter the metal layer maybe deposited by the sputtering technique. Subsequently, the metal layer maybe patterned by the wet etching, and thereafter, the first and second semiconductor materials maybe patterned by dry etching, Alternatively, all of the metal layers and the first and second semiconductor materials maybe patterned by dry etching or wet etching.

The gate insulating film 39 is made from an insulating material such as silicon nitride ($SiN_x$) or silicon oxide ($SiO_x$). The active layer 45 is formed from a first semiconductor layer or amorphous silicon without impurity doping. On the other hand, the ohmic contact layer 47 is formed from a second semiconductor layer of amorphous silicon doped with an n-type or p-type impurity. The first barrier metal layer 59a is made from titanium (Ti), tantalum (Ta), tungsten (W), chrome (Cr) or molybdenum (Mo), etc.

Figure 7C:
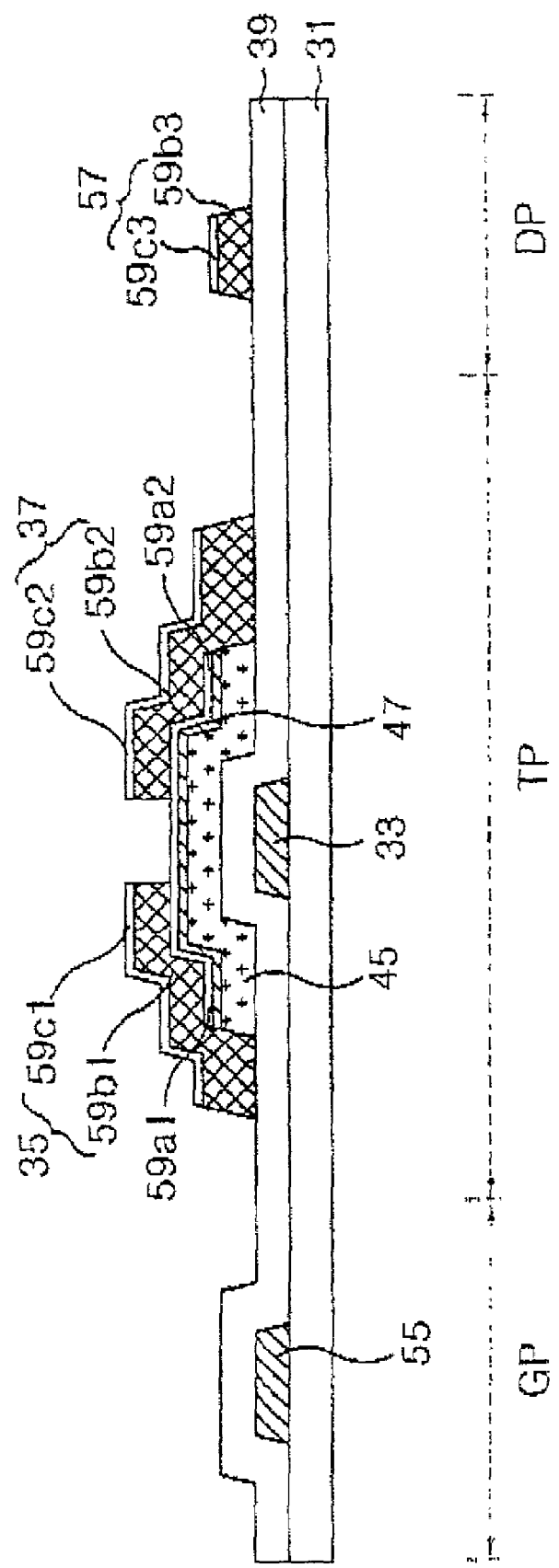

Referring to FIG. 7C, the data pad 57, the source electrode 35 and the drain electrode 37 are provided on the gate insulating film 39.

The data pad 57, the source electrode 35 and the drain electrode 37 are formed by depositing the main metal layer 59b and the second barrier metal layer 59c and then by patterning simultaneously the main metal layer 59b and the second barrier metal layer 59c through a wet etching process. The first barrier metal layer 59a is not etched because the wet-etching period For the main metal layer 59b and the second barrier metal layer 59c is shorter than that for the conventional three metal layers, that is, the first barrier metal layer 6a, the main metal layer 6b and the second barrier metal layer 6c. In other words, the wet etching process in the present invention allows only the main metal layer 19b and the second barrier metal layer 59c to be patterned.

Figure 7D:
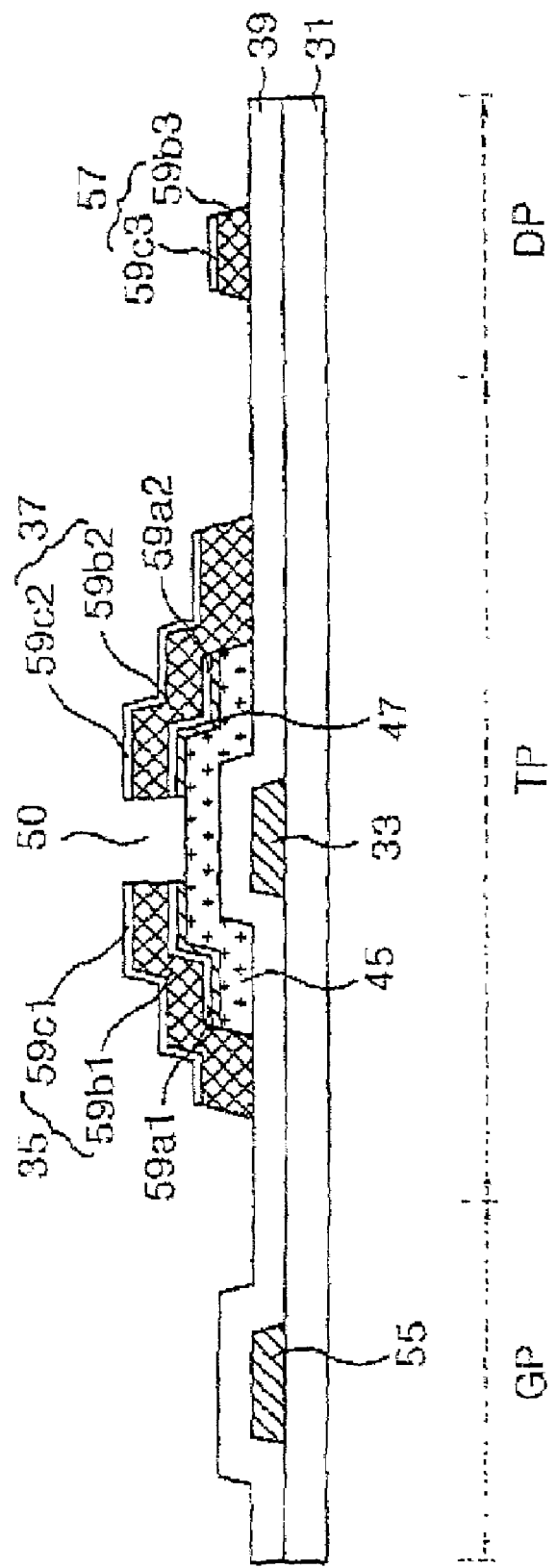

Thereafter, the first barrier metal layer 59a and a portion of the ohmic contact layer 47 above the gate electrode 33 are patterned through a dry etching process using the source and drain electrodes 35 and 37 (i.e., 59b1 to 59b3 and 59c1 to 59c3) as a mask, thereby exposing the active layer 45 between the source and drain electrodes 35 and 37, as shown in FIG. 7D. The portion of the active layer 45 being exposed between the source and drain electrodes 35 and 37 and being opposed to the gate electrode 33 makes a channel 50.

The main metal layer 59b is composed of a material such as Al or an Al alloy. The first and second barrier metal layers 59a and 59c may be composed of Ti, Ta, W, Cr or Mo, and may also be formed from the same material. Additionally, the second barrier metal layer may be composed of a material different from the first barrier metal layer 59a.

Referring to FIG. 7E, the protective layer 51 is provided on the gate insulating layer 39. The protective layer 51 is formed by depositing an insulating material onto the gate insulating layer 39. The insulating layer is then patterned so that it covers the data pad 57, the source electrode 35 and the drain electrode 37, and has gate contact hole 49a, drain contact hole 49b and data contact hole 49c.

The protective layer 51 is made from an inorganic insulating material such as silicon nitride ($SiN_x$) or silicon oxide ($SiO_x$), or an organic insulating material such as an acrylic organic compound, BCB (benzocyclobutene), fluoro resin or PFCB (perfluorocyclobutane).

Figure 7F:
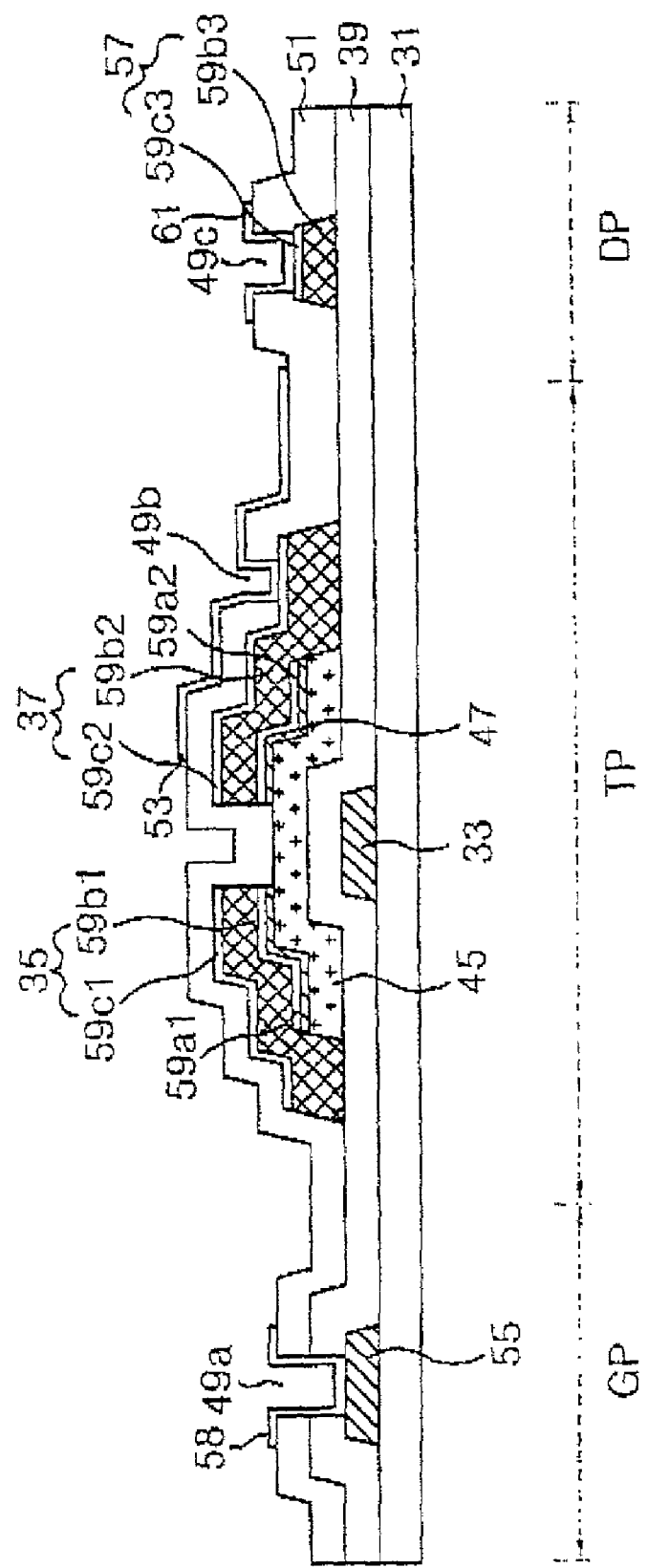

Referring to FIG. 7F, the pixel electrode 53, the gate pad terminal electrode 58 and the data pad terminal electrode 61 are provided on the protective layer 51, The pixel electrode 53, the gate pad terminal electrode 58 and the data pad terminal electrode 61 are formed by depositing a transparent conductive material onto the protective layer 51 and patterning the deposited material.

The pixel electrode 53 is patterned so that it is in electrical contact with the drain electrode 37 through the drain contact hole 49b. The data pad terminal electrode 61 is patterned so that it is in electrical contact with the data pad 57 through the data contact hole 49c. The gate pad terminal electrode 58 is patterned so that it is in electrical contact with the gate pad 55 through the gate contact hole 49a.

Each of the pixel electrode 53, the gate pad terminal electrode 58 and the data pad terminal electrode 61 is formed from a transparent conductive material such as indium-tin-oxide (ITO), indium-zinc-oxide (IZO) or indium-tin-zinc-oxide (ITZO).

As described above, the semiconductor layers are formed in the same pattern as the first barrier metal layer 59a. Accordingly, an over-etching of the first barrier metal layer can be prevented. Furthermore, a contact between the main metal layer and the semiconductor layers caused by the over-etching of the first barrier metal layer is prevented. As a result, it is possible to prevent a characteristic deterioration in the thin film transistor. In addition, it becomes possible to improve the quality and a throughput of the high resolution LCD device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:
   a substrate;
   a gate electrode over the substrate;
   a first semiconductor layer over the gate electrode;
   a second semiconductor layer over the first semiconductor layer defining a separation region with the first semiconductor layer;
   a first metal layer on the second semiconductor layer to define a separation region, wherein the first metal layer is patterned in a same pattern as the second semiconductor layer such that an outer edge of the first metal layer and an outer edge of the second semiconductor layer are lined up with one another to define a separation region for exposing some surfaces of the first semiconductor layer;
   source and drain electrodes, each having a first portion overlapping with the first metal layer and the second semiconductor layer to define a first upper portion of the separation region that abuts the lined up outer edges of the first and second semiconductor layers, and a second portion overlapping with the substrate around the gate electrode, wherein the source and drain electrodes include a second and a third metal layer, wherein the first, second and third metal layers comprise a same step shape that are symmetrical with respect to each other, the second metal layer extends beyond edges of the first semiconductor layer, the first metal layer extends only to edges of the first semiconductor layer, and the first and third metal layers do not contact each other; and a data pad over the substrate including the second and third metal layers.

2. The device of claim 1, further comprising:

an insulating layer in between the gate electrode and the first semiconductor layer;

a protective layer over the source and drain electrodes and defining a second upper portion of the separation region and a contact hole exposing a portion of the drain electrode; and a pixel electrode in the contact hole.

3. The device of claim 1, wherein the second metal layer includes aluminum or an aluminum alloy.

4. The device of claim 1, wherein the first and third metal layers are formed of the same material.

5. The device of claim 4, wherein the first and third metal layers include titanium, tungsten, tantalum, chromium or molybdenum.

6. The device of claim 1, wherein the first and third metal layers are formed of different materials.

7. The device of claim 1, wherein the first and third metal layers include titanium, tungsten, tantalum, chromium or molybdenum.

8. A method of forming a liquid crystal display device, comprising:

forming a gate electrode on a substrate;

forming an active layer over the gate electrode;

forming a first semiconductor layer over the active layer;

forming a second semiconductor layer over the first semiconductor layer to define a separation region with the first semiconductor layer;

forming a first metal layer over the second semiconductor layer;

forming and patterning a source electrode and a drain electrode over the first metal layer using a wet-etch process for a limited period to prevent over-etching of the first metal layer; and subsequently patterning the first metal layer and the second semiconductor layer in a same pattern by dry-etching using the previously formed and patterned source and drain electrodes as a mask to expose the active layer between the source and drain electrodes to create a defined outer edge of the first metal layer and a defined outer edge of the second semiconductor layer lined up with one another to define the separation region and thereby reduce a leakage current, wherein forming the source and drain electrodes includes:

forming a second metal layer over the first metal layer, forming a third metal layer over the first metal layer, and patterning the second and third metal layers in the same pattern as the first metal layer and second semiconductor layer in the channel region so that a channel portion of the first semiconductor layer is exposed, and wherein the first, second and third metal layers are formed to have a same step shape that are symmetrical with respect to each other, the second metal layer extends beyond edges of the first semiconductor layer, the first metal layer extends only to edges of the first semiconductor layer, and the first and third metal layers do not contact each other.

9. The method of claim 8, wherein the first metal layer is formed of titanium, tungsten, tantalum, chromium or molybdenum.

10. The method of claim 8, wherein the first and third metal layers are formed of the same material.

11. The method of claim 8, wherein the first and third metal layers are formed of a different material.

12. The method of claim 8, wherein the second metal layer is formed of aluminum or an aluminum alloy.

13. The method of claim 8, wherein the first and third metal layers are formed of titanium, tungsten, tantalum, chromium or molybdenum.

14. The method of claim 8, wherein the patterning of the first metal layer and the second semiconductor layer to define a channel region includes removing a portion of the first metal layer and second metal layer corresponding to the gate electrode and exposing the first semiconductor layer.

15. A method of forming a liquid crystal display device, comprising:

forming a gate electrode on a substrate;

forming an active layer over the gate electrode;

forming a first semiconductor layer over the active layer;

forming a second semiconductor layer over the first semiconductor layer to define a separation region with the first semiconductor layer;

forming a first metal layer over the second semiconductor layer to define a separation region;

forming and patterning a source electrode and a drain electrode over the first metal layer by a wet-etch process of limited duration that allows the source electrode and the drain electrode to be etched but does not allow over-etching of the first metal layer;

forming an ohmic contact layer on the second semiconductor layer; and subsequently patterning, simultaneously, the first metal layer, the second semiconductor layer, and the ohmic contact layer in a same pattern by dry-etching using the previously formed and patterned source and drain electrodes as a mask to expose the active layer between the source and drain electrodes defined outer edge of the first metal layer and a defined outer edge of the semiconductor layer lined up with one another to define the separation region and to reduce over-etching of the first metal layer and thereby reduce a leakage current, wherein the first, second and third metal layers are formed to have a same step shape that are symmetrical with respect to each other, the second metal layer extends beyond edges of the first semiconductor layer, the first metal layer extends only to edges of the first semiconductor layer, and the first and third metal layers do not contact each other.

16. A liquid crystal display device produced by the process of claim 15.

* * * * *